A. L. GATES.
ENLARGING CAMERA.
APPLICATION FILED APR. 23, 1915.
1,155,142.
Patented Sept. 28, 1915.
2 SHEETS—SHEET 1.
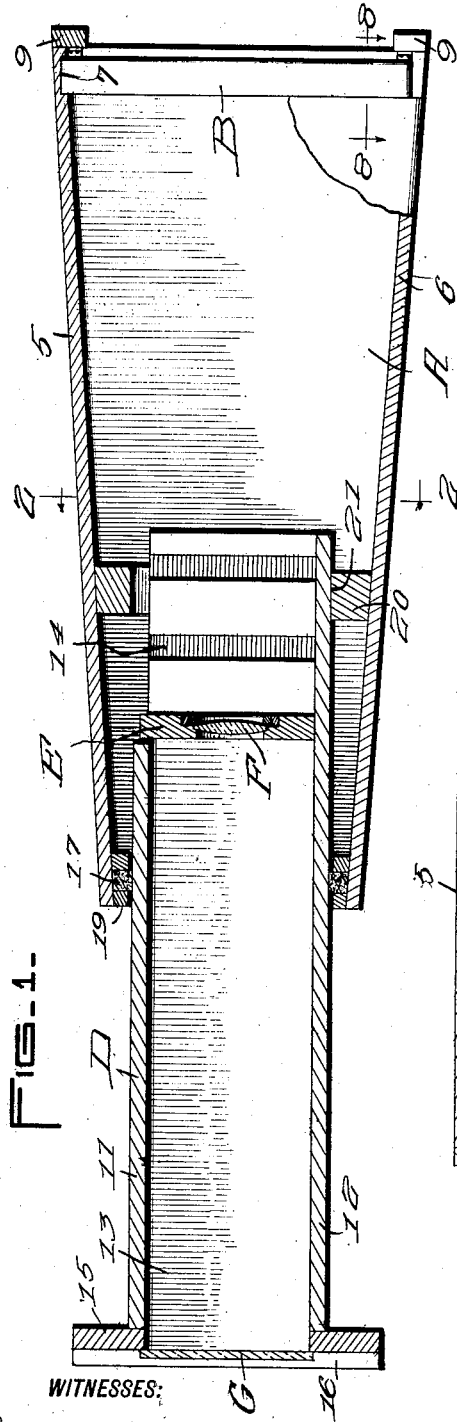
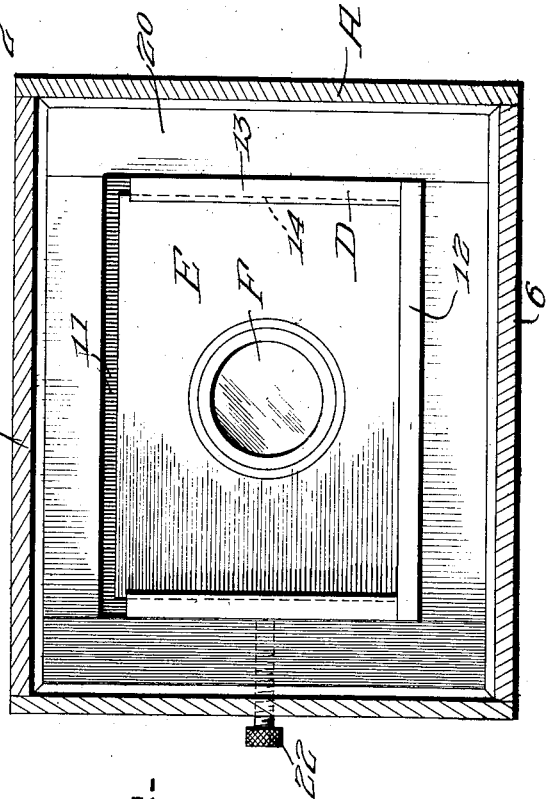
WITNESSES:
INVENTOR
ARTHUR L. GATES,
BY Munn&Co.
ATTORNEYS

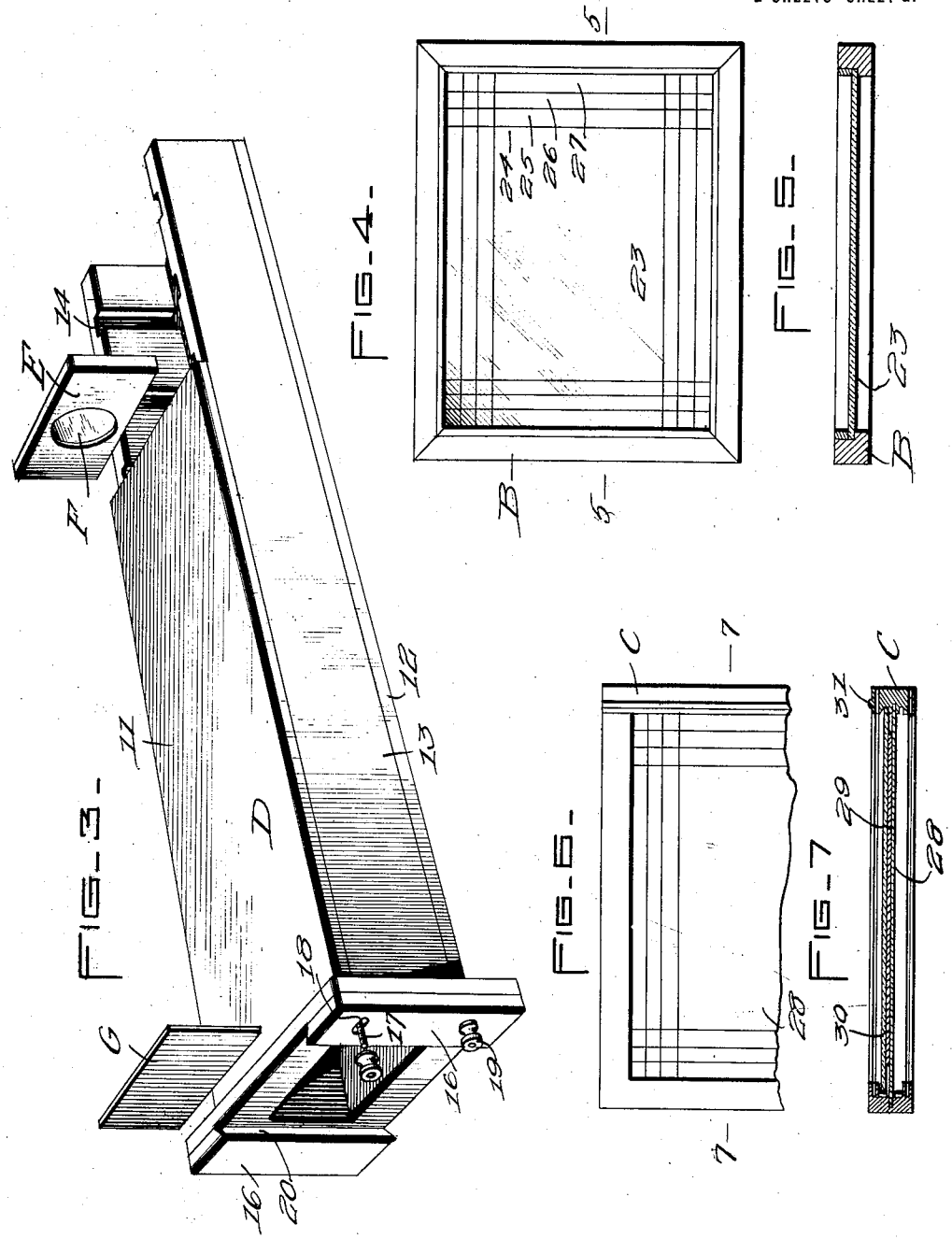

UNITED STATES PATENT OFFICE.

ARTHUR L. GATES, OF CAWKER CITY, KANSAS, ASSIGNOR OF ONE-HALF TO JOSEPH F. MERGEN, OF CAWKER CITY, KANSAS.

ENLARGING-CAMERA.

1,155,142.   Specification of Letters Patent.   Patented Sept. 28, 1915.

Application filed April 23, 1915. Serial No. 23,375.

*To all whom it may concern:*

Be it known that I, ARTHUR L. GATES, a citizen of the United States, and a resident of Cawker City, in the county of Mitchell and State of Kansas, have invented certain new and useful Improvements in Enlarging-Cameras, of which the following is a specification.

This invention relates to an improvement in enlarging cameras, and one of the principal objects of the invention is to provide an enlarging camera of such construction that the negative, lens, and focusing screen or plate may be adjusted relatively to each other in order to secure a proper image and in order that enlargements of various sizes may be made.

Another object of the invention is to provide an improved camera of the type set out, in the nature of a box or casing in one end of which the focusing screen and plate holder are adapted to be interchangeably disposed and in the other end of which a tube is slidably arranged whereby to be moved within the casing relatively to the focusing screen or plate holder, and in which tube the negative and lens are carried, means being provided whereby the lens may be adjusted within the tube relatively to the negative.

A further object is to provide an enlarging camera of the class described, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings, in which like characters of reference indicate like parts throughout the several figures of which—

Figure 1 represents a view in section taken vertically and longitudinally through an enlarging camera constructed according to my invention. Fig. 2 represents a view in section taken vertically and transversely on the plane indicated by the line 2—2 of Fig. 1. Fig. 3 represents a view in perspective of the telescoping tube. Fig. 4 represents a plan view of the focusing screen or plate. Fig. 5 represents a view in section taken therethrough on the plane indicated by the line 5—5 of Fig. 4. Fig. 6 represents a fragmentary plan view of the plate holder. Fig. 7 represents a view in section taken through the plateholder on the plane indicated by the line 7—7 of Fig. 6. Fig. 8 represents a view in section taken on the plane indicated by the line 8—8 of Fig. 1 the plate holder being shown in full lines.

In carrying out my invention, I provide a box or casing A, whose top and side walls are converged toward the front end of the casing. At its rear end, the box or casing A is provided with a guideway in the nature of a groove in its upper and lower walls 5 and 6, respectively, the grooves being indicated by the numeral 7. This guideway is intended to receive the holders of a focusing screen, and a sensitized plate, interchangeably. The focusing screen holder is indicated at B and the plate holder is indicated at C. They may be slipped into position at the rear end of casing A, through an opening 8 in one of the side walls thereof. This opening, indicated in Fig. 8, may be formed by virtually shortening one of the side walls at its rear end. Strips 9 may be secured to the rear ends of the top and bottom walls of the casing to coact with the guideways in supporting the frames, said strips being provided on their front surfaces with horizontally extending leaf springs 10. The latter are adapted to engage the top and bottom rails of the holders when they are inserted, in order to maintain said holders snugly within the guideways.

Within the forward end of the casing A is telescopically disposed a tube D. The latter similarly to casing A, may be made of wood or other suitable material, and this tube is hollow, including the top and bottom walls 11 and 12 respectively, and the side walls 13. At its rear end the top wall 11 is shortened, and from the point at which the rear end of wall 11 occurs relatively to the side walls, the latter are provided at spaced intervals with vertical slots or guideways 14. The number of guideways is of course optional, and they are arranged in pairs, the pairs occurring at spaced intervals from each other. These guideways are for the reception of the lens holder E which is in the form of a rectangular plate, and by means of which the lens F is carried. By the arrangement described it will be evident that the lens may be adjusted longitudinally of the tube D.

The forward end of the tube D is provided with the outwardly extending flange 15. On the front face of the vertical members of the same are disposed the strips or plates 16. One of the latter is securely fixed to the flange, while the other one is carried for lateral adjustment upon the threaded bolts 17 secured to the flange and which extend through slots or elongated openings 18 provided in that plate or strip. The thumb nuts 19 carried by bolts 17 may be utilized in tightening the plate against the flange in adjusted position. The inner edges of these plates or strips 16 are beveled as at 20, and between these beveled edges is adapted to be engaged the negative G which is to be enlarged.

Arranged in the forward end of the casing A is a bearing through which the tube D is adapted to slide. This bearing is in the nature of a surrounding strip 17 of felt or other suitable material, engaged between retaining pieces 19 suitably secured to the inner faces of the casing. This strip 17 while serving as a bearing for the tube, also prevents the admission of light to the interior of boxing A. At a point within the casing is disposed a partition 20 provided with an opening 21 of dimensions conforming with the outer transverse dimensions of tube D, and through which said tube is adapted to slidably extend. The opening in partition 20 is disposed in horizontal alinement with the opening in the bearing through which the tube slides. A set screw 22 carried in one of the side walls of the casing A serves as means whereby the tube D may be maintained in adjusted position relatively to said casing.

The focusing screen frame B carries preferably a ground glass plate 23 against which the image from the negative G may be projected to be observed by the operator, whereby to secure a proper focus. This plate is provided with a plurality of rectangular concentric zones or fields 24, 25, 26, and 27, defined by spaced parallel lines imprinted in any suitable manner upon one of the surfaces of the plate. The zones or fields thus provided are of varied areas, and by observing the size of the projection of the negative upon the plate, with reference to the zones, the proper size of sensitized paper or plate to be carried by the plate holder C in making the enlargement of the negative, may be ascertained. This plate holder is of the ordinary double plate type, and upon the opaque sheet 28 supported thereby, may be defined zones conforming in size and shape with the zones defined upon the plate 23. By thus having the focusing screen and sheet 28 analogously zoned or marked, the proper size and location of the sensitized plate to be carried by the holder, may be readily ascertained. This sensitized plate is indicated in Fig. 7 at 29, and a sheet of transparent material 30 to overlie the plate and maintain the same in position is provided as usual.

The plate holder C is provided along one edge with a rib or bead 31, adapted to be engaged when the holder is positioned within the casing A, within a channel or groove 32 provided in the shortened wall of the casing, as indicated in Fig. 8. This arrangement provides for the exclusion of light from the casing along this joint.

The ground glass or focusing screen holder, is of course of a size similar to the size of the plate holder, and as before stated, this glass is used in ascertaining the proper focus for the enlargement. If desired, the telescoping tube may be graduated or marked after the proper focus is found, for each position of the lens.

Although I have described the preferred embodiment of my invention, I may desire to make such changes in the construction, combination and arrangement of parts thereof as do not depart from the spirit of the invention and the scope of the appended claims.

I claim:—

1. An enlarging camera comprising a casing tapering toward its front end, a guideway at the rear end of the casing for the reception of a plate or screen holder, a light excluding bearing arranged in the forward end of the casing, a tube slidably extending through the bearing and projecting within the casing, said tube having one of its walls shortened and being provided on its walls adjacent the shortened wall with a plurality of spaced guideways, a lens holder adapted to be positioned within the guideways, said guideways being provided adjacent the inner end of said tube, an outwardly extending flange provided at the outer end of the tube, a pair of strips carried by the flange in opposed and spaced relation to each other, one of the strips being fixed relatively to the flange, means whereby the other strip may be adjusted laterally relatively to the fixed strip, said strips being provided with means whereby a negative may be clamped between them, and a partition arranged within the casing and provided with an opening for the slidable reception of the inner end of said tube.

2. In a device of the class described, the combination of a casing open at both ends, a light excluding bearing arranged in one end of the casing, a tube slidably extending through said bearing and projecting within the casing, a guideway provided in the opposite end of the casing, a screen holder and a plate holder adapted to be interchangeably engaged within the guideway, a lens holder, means associated with the tube whereby the lens holder may be adjustably positioned longitudinally of the tube, a pair of strips disposed at the outer end of the tube, and being adjustable one toward and away from the other, whereby a negative may be clamped between them, and a partition arranged within the casing and provided with an opening through which said tube is adapted to be slidably extended.

3. In a device of the class described, the combination of a casing open at both ends, a tube slidably extending through one end of the casing and projecting within the latter, a plate holder and a focusing screen holder, means arranged at the opposite end of the casing whereby the plate holder and focusing screen holder may be interchangeably disposed in said opposite casing end, a lens holder, means associated with the tube whereby said lens holder may be adjustably disposed longitudinally of the tube, means whereby a negative may be positioned at the outer end of the tube, and means whereby the tube may be maintained in adjusted position relatively to the casing at will.

4. In a device of the class described, the combination of a casing, a tube telescopically engaging within the casing, a plate holder and a focusing screen holder adapted to be interchangeably disposed within the casing, a lens holder, means whereby the same may be adjusted longitudinally of the tube, and means whereby a negative may be secured to the tube relatively to the lens holder.

5. In a device of the class described, the combination with a casing and a tube adjustable one relatively to the other, and having means whereby a negative and a lens may be carried in adjusted positions relatively to each other, of a focusing screen and a plate holder adapted to be interchangeably disposed within the casing, said screen and holder being provided with analogous zones of various areas.

ARTHUR L. GATES.

Witnesses:
A. W. ROBINSON,
C. M. HIGLEY.